United States Patent [19]

Kobayashi

[11] Patent Number: 5,107,400
[45] Date of Patent: Apr. 21, 1992

[54] PORTABLE APPARATUS HAVING DETACHABLE STORAGE UNIT WITH A LOCK MECHANISM OPERATING A SWITCH CONTROLLING POWER TO THE STORAGE UNIT

[75] Inventor: Takaichi Kobayashi, Tokyo, Japan

[73] Assignee: Kabushiki Kaisha Toshiba, Kawasaki, Japan

[21] Appl. No.: 619,529

[22] Filed: Nov. 29, 1990

[30] Foreign Application Priority Data

Nov. 30, 1989 [JP] Japan .................. 1-311394

[51] Int. Cl.$^5$ .......... H05K 7/00; H01H 3/20; E05C 1/04; G06F 1/00
[52] U.S. Cl. .................. 361/392; 314/708; 292/153; 200/50 R; 200/61.58 R
[58] Field of Search .......... 364/708; 361/380, 392, 361/393, 394, 395, 399; 292/137, 145, 149, 153, 212, DIG. 69

[56] References Cited

U.S. PATENT DOCUMENTS 4,018,148  4/1977  Wolbrink .............. 292/DIG. 69 X
4,903,222  2/1990  Carter et al. .
4,926,365  5/1990  Hsieh ..................... 364/708
4,978,949 12/1990  Herron et al. ............. 364/708 X

OTHER PUBLICATIONS

A Catalog of Epson PC-386LS, 32-Bit Laptop PC.

Primary Examiner—Leo P. Picard
Assistant Examiner—Michael W. Phillips
Attorney, Agent, or Firm—Cushman, Darby & Cushman

[57] ABSTRACT

A portable computer includes a base unit for mounting a keyboard and a display unit. The base unit includes a bottom plate. A receiving portion in which a hard-disk drive device (HDD) is detachably mounted is formed in the bottom plate. The HDD is formed into a unit as a module and has a first connector. The receiving portion of the base unit includes a second connector to be electrically connected to the first connector, a lock mechanism which is engaged with the HDD to confine the HDD in the receiving portion, and a switch which is operated upon a lock operation of the lock mechanism so as to allow current supply to the HDD. The HDD is fixed to the receiving portion by a screw. The screw is engaged with the lock mechanism to hold the lock mechanism in a state wherein the HDD is locked to the receiving portion.

13 Claims, 17 Drawing Sheets

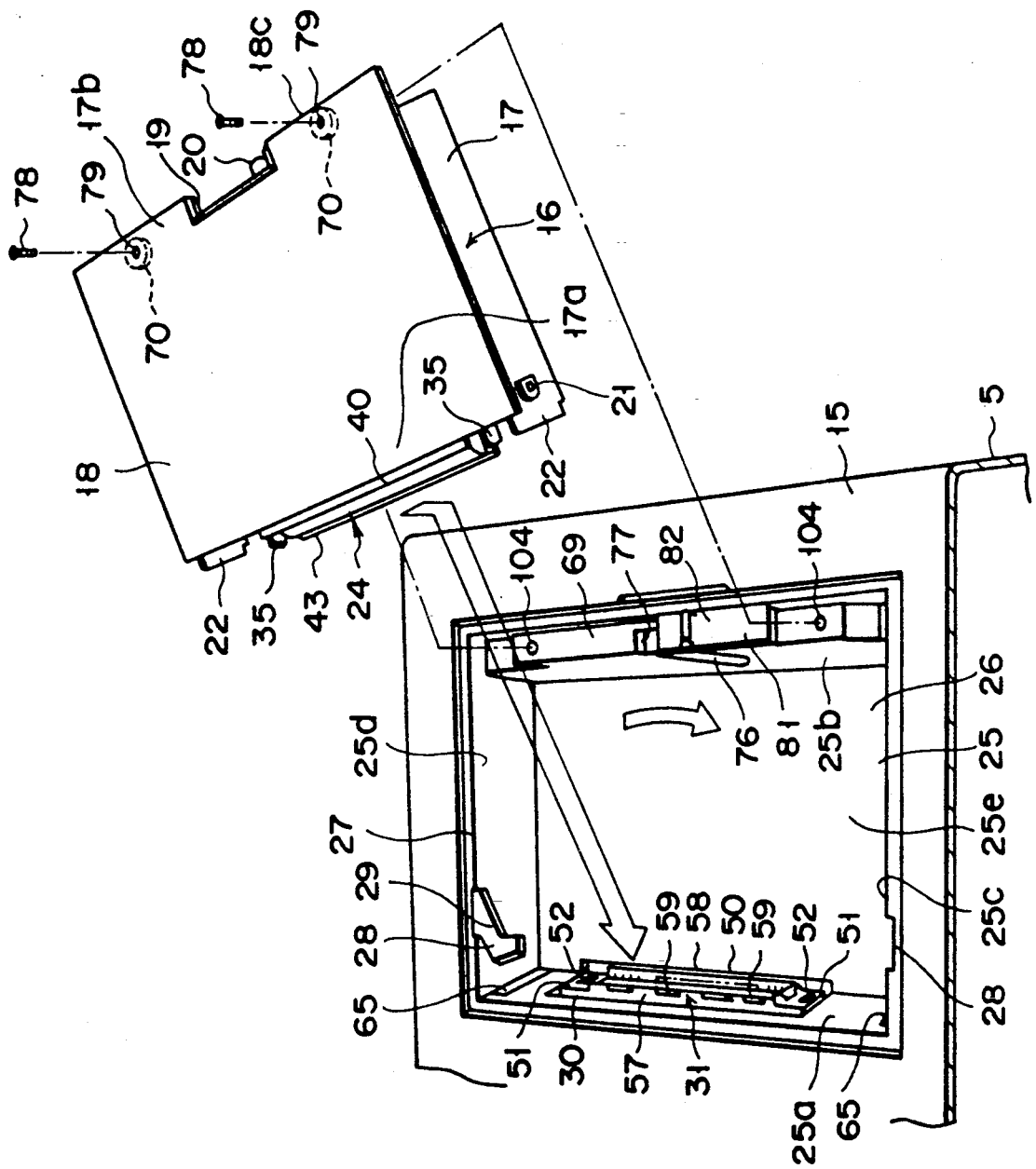
F I G. 2

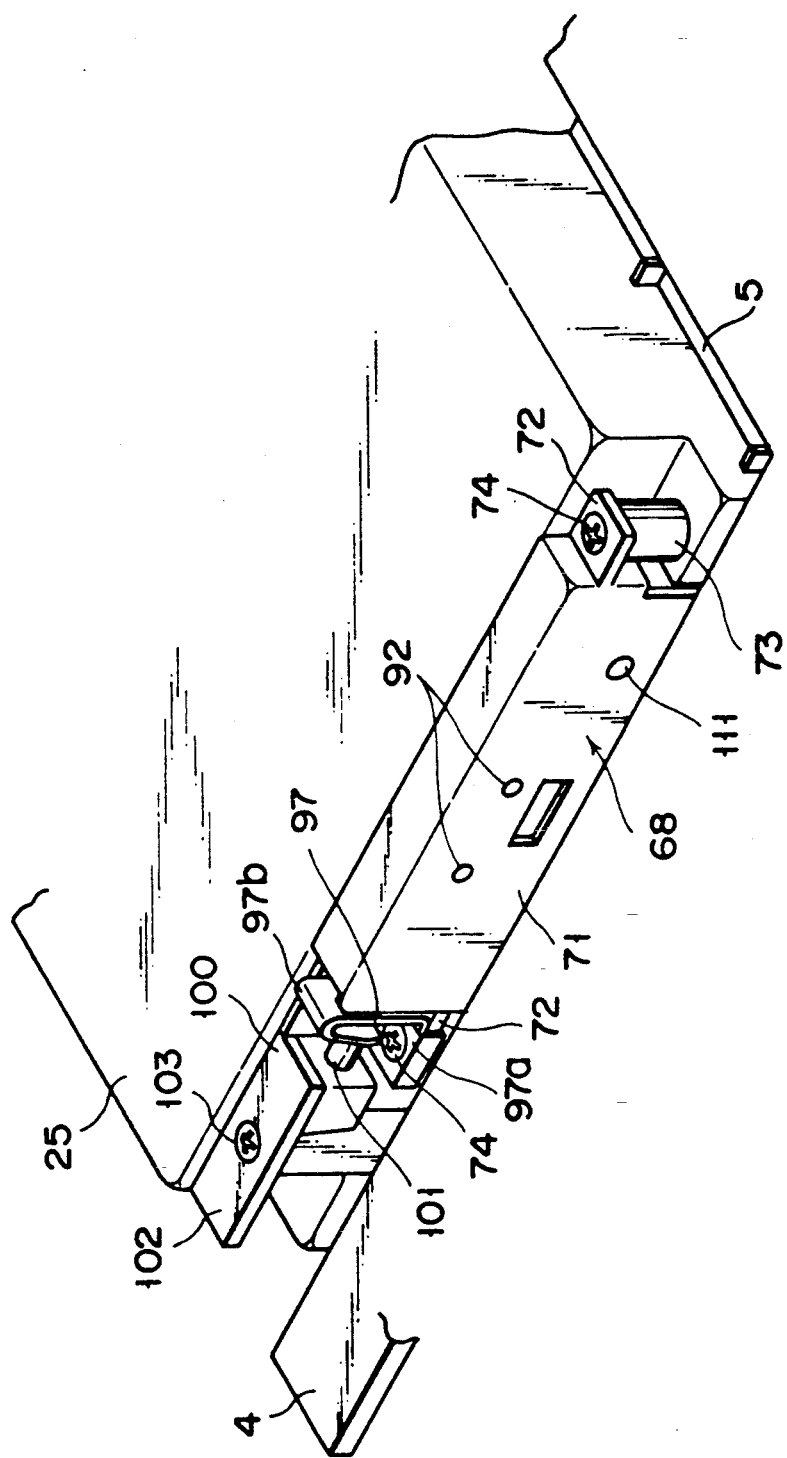
F I G. 7

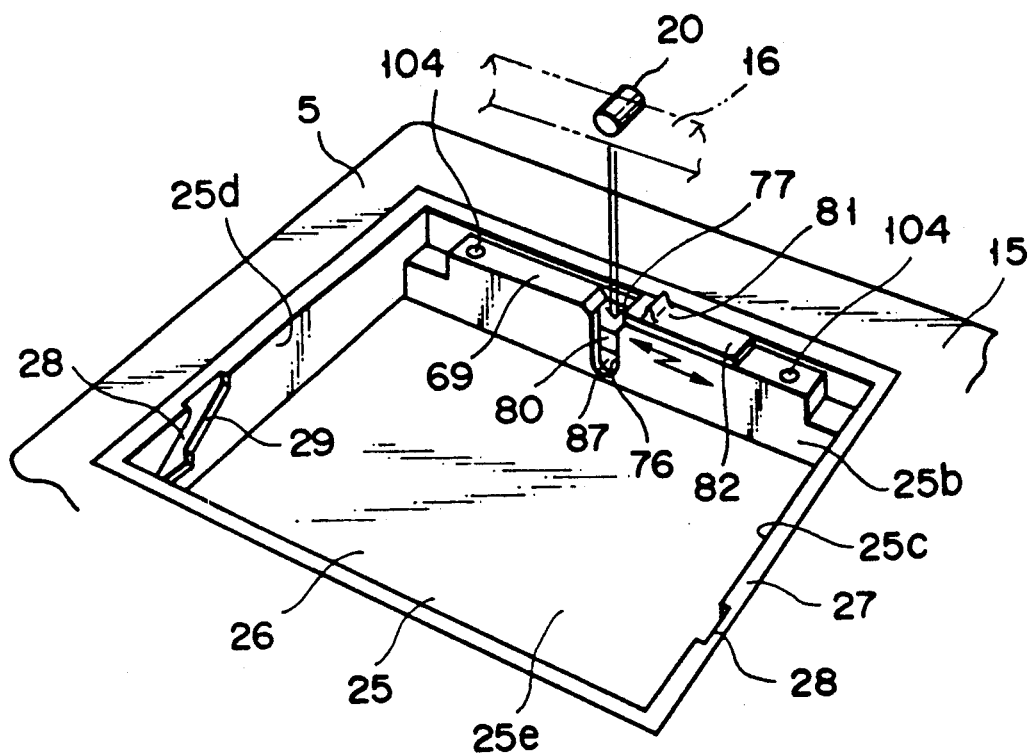
F I G. 8

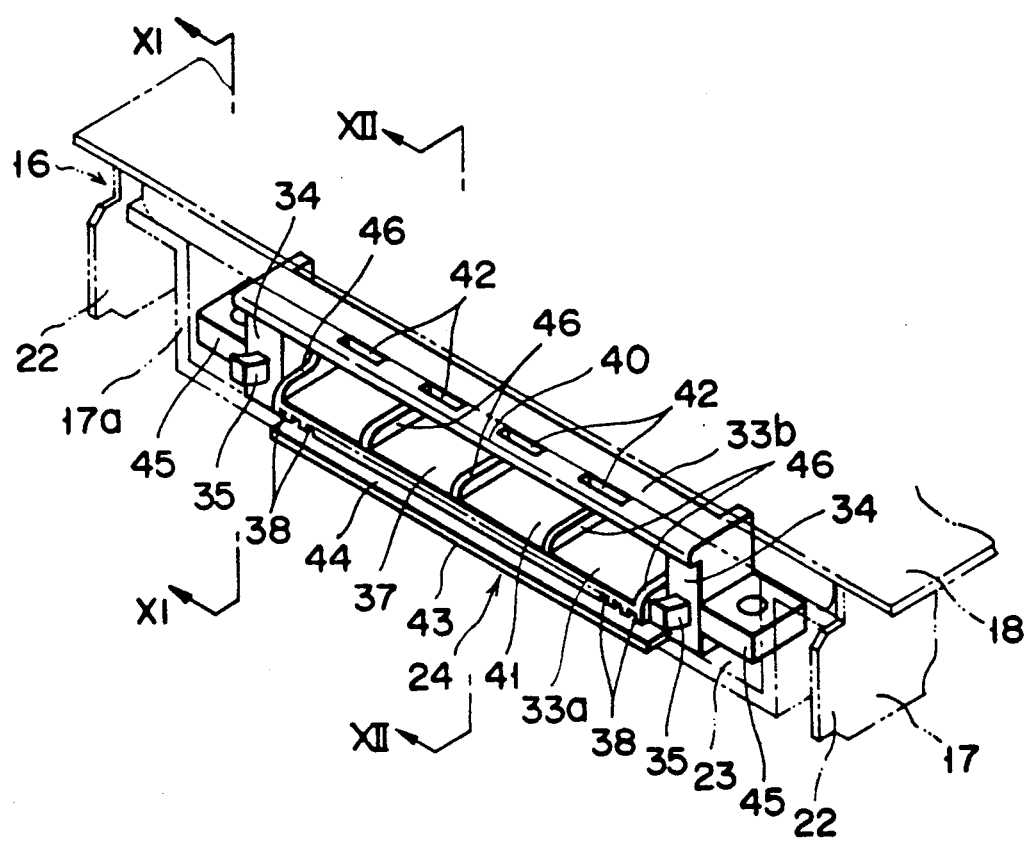
F I G. 10
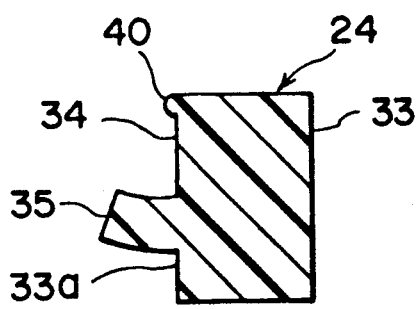
F I G. 11
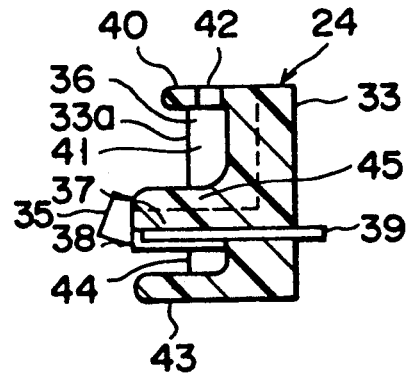
F I G. 12

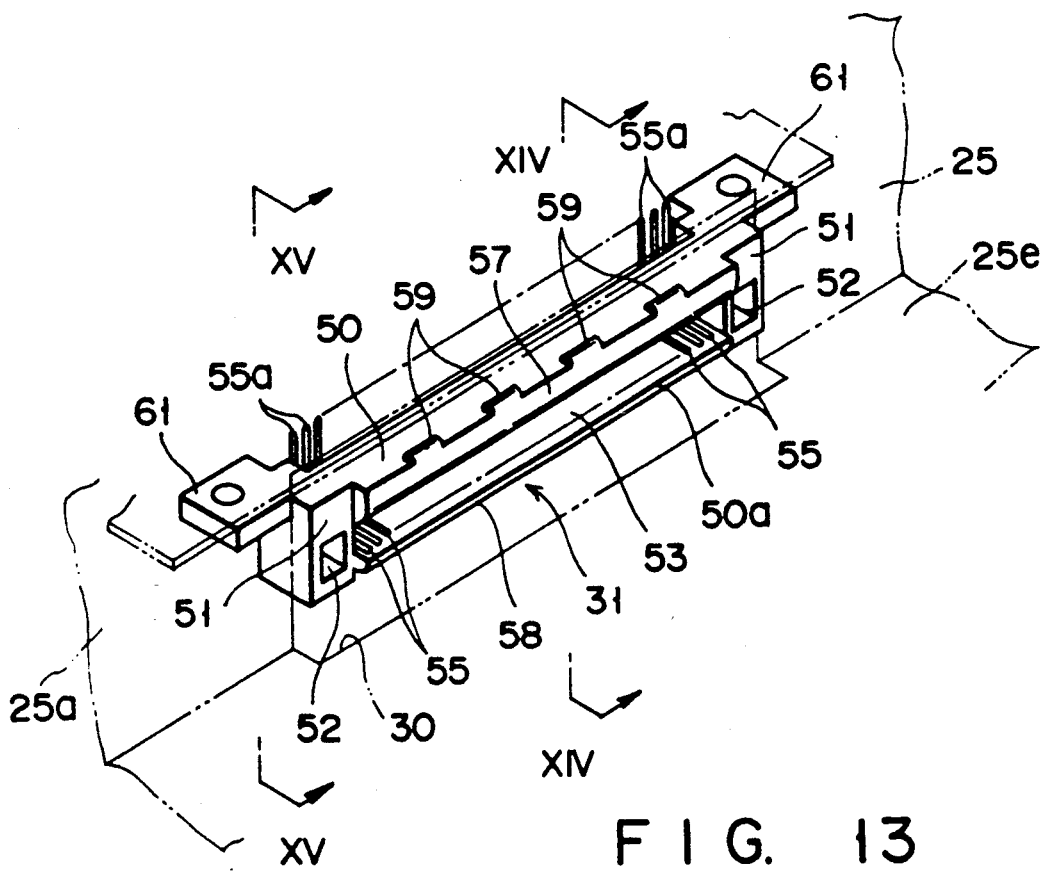
FIG. 13
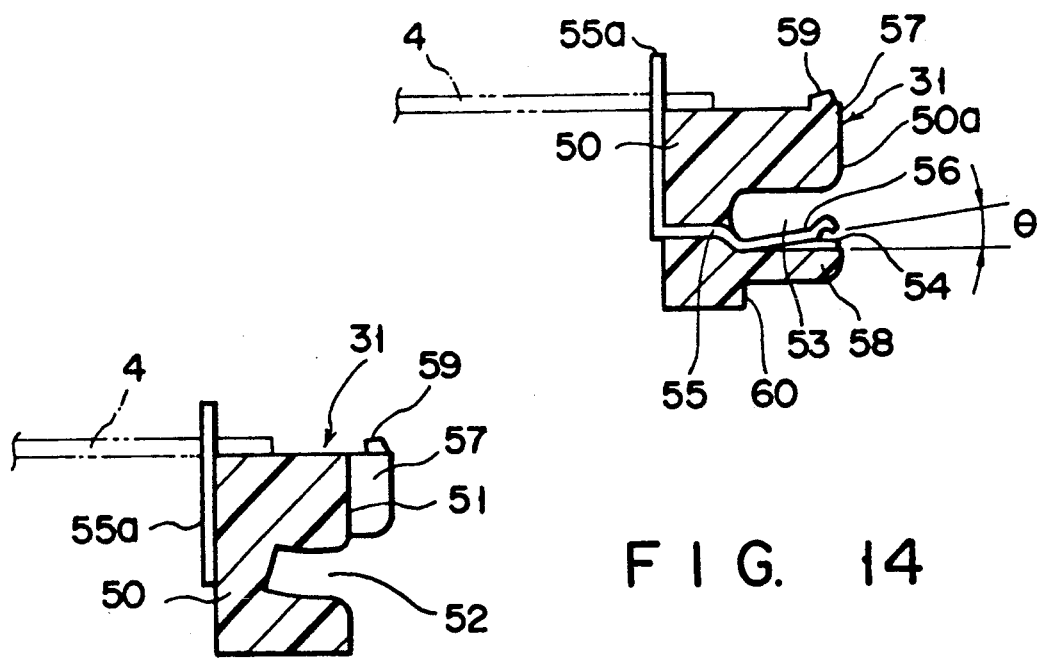
FIG. 14
FIG. 15

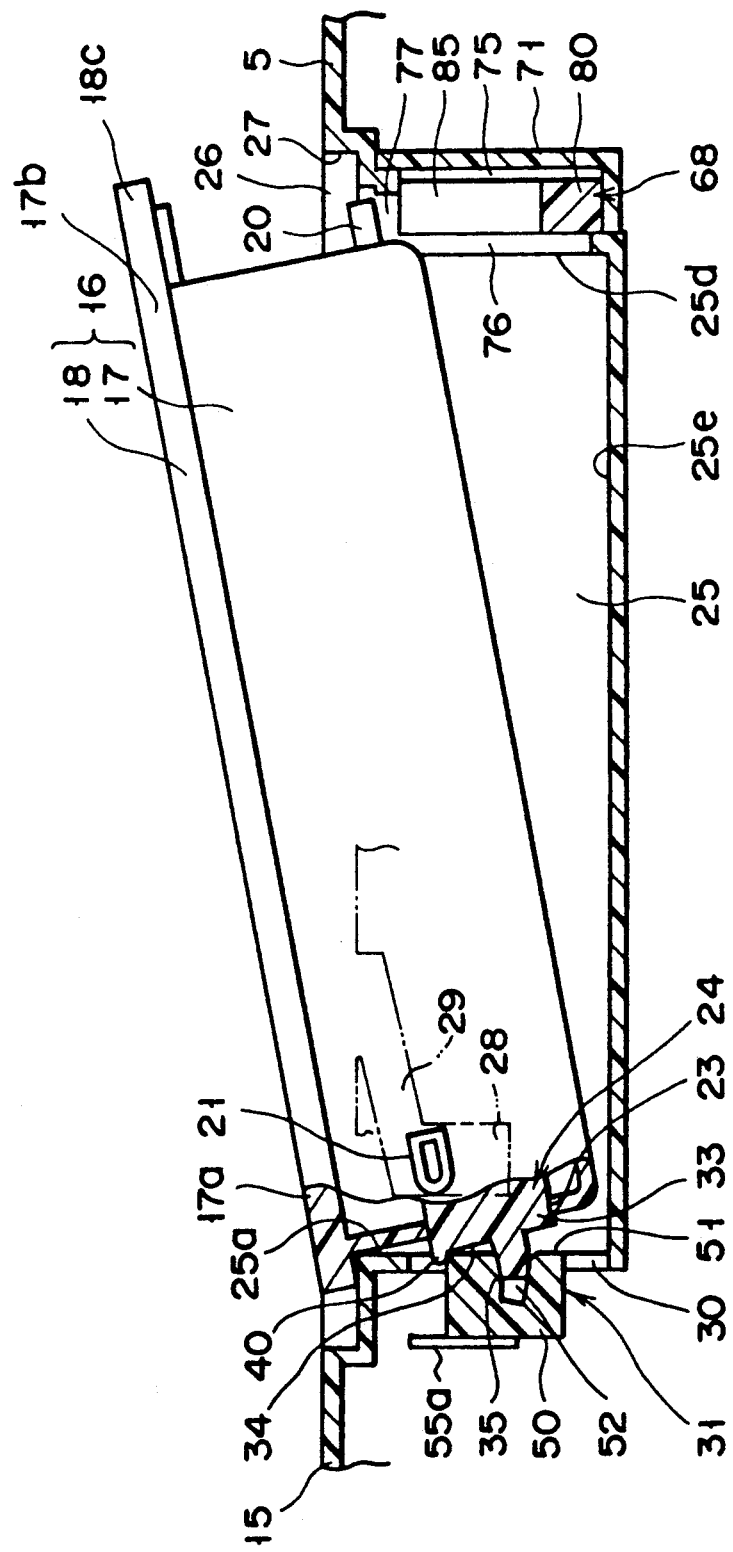
F I G. 21

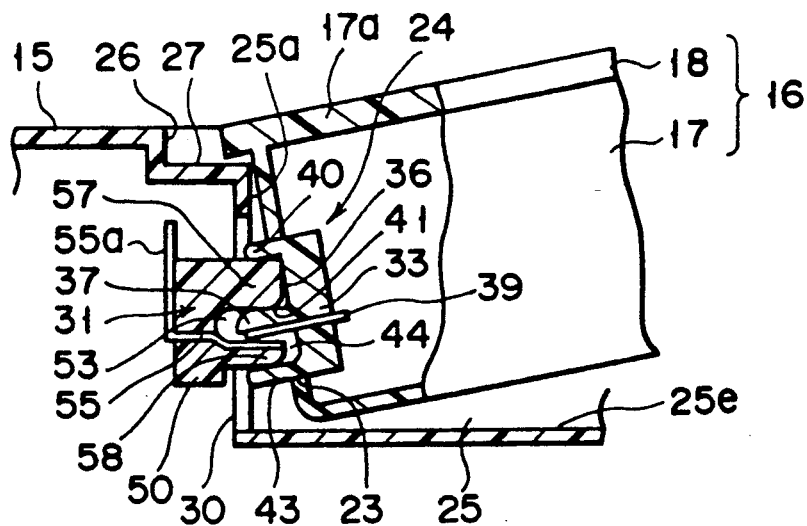
F I G. 22
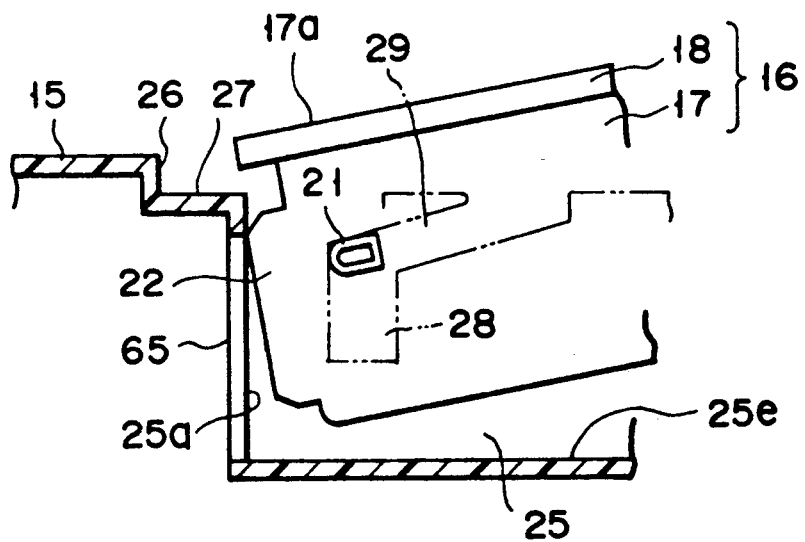
F I G. 23

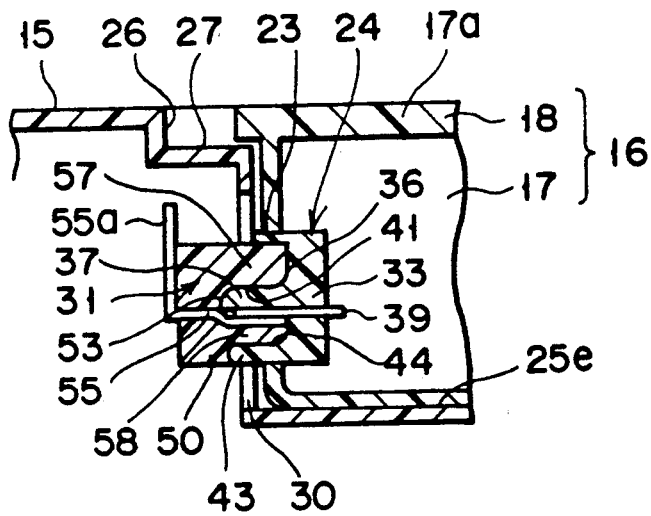
F I G. 27
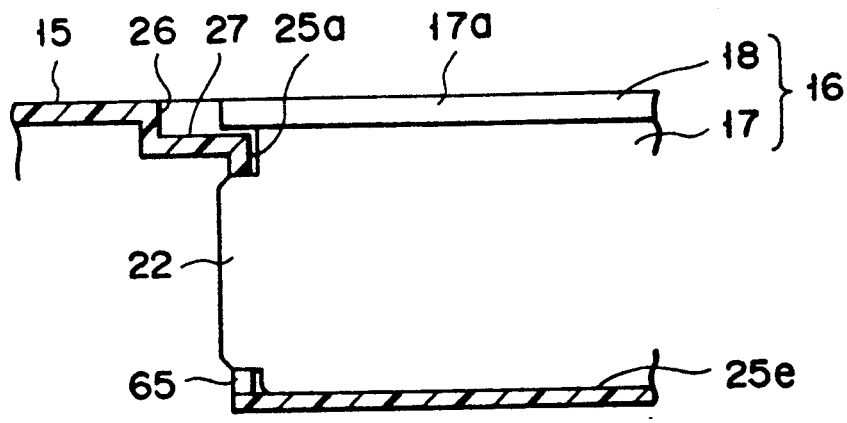
F I G. 28

PORTABLE APPARATUS HAVING DETACHABLE STORAGE UNIT WITH A LOCK MECHANISM OPERATING A SWITCH CONTROLLING POWER TO THE STORAGE UNIT

BACKGROUND OF THE INVENTION

1. Field of the Invention

The present invention relates to a portable apparatus such as a lap-top type or portable type computer. More particularly, this invention relates to a structure for detachably mounting a storage unit such as a hard-disk drive device (HDD) or a floppy-disk drive device (FDD) in a base unit of a computer.

2. Description of the Related Art

In recent years, a lap-top type, portable computer having a keyboard and a flat panel type display unit attached to a box-like base unit has been widely used.

In such a portable computer, an HDD or FDD is mounted in a base unit, as disclosed in U.S. Pat. No. 4,903,222. In a portable computer of this type, an auxiliary HDD formed into a unit as one module is detachably mounted in a base unit to process a large amount of data. This HDD includes a box-like flat case having a first connector. In this case, a driving unit for rotating a hard disk, and a head for writing and reading data in and from the hard disk are housed. The head and the driving unit are electrically connected to the first connector.

The base unit includes a receiving portion for mounting the HDD. The receiving portion is open to the rear surface of a rear portion of the base unit, and a second connector is arranged in this opening. The second connector is electrically connected to electronic equipments mounted in the base unit. When the HDD is inserted in the opening of this base unit, the two connectors are connected to each other. Upon this connection, the HDD is electrically connected to the base unit to allow write and read operations of data.

The base unit includes a lock unit for holding the HDD in the opening. When the HDD is locked by this lock unit, the HDD cannot move inside the opening to prevent disconnection of the first and second connectors from each other.

The lock unit is designed such that lock and lock release operations of the HDD can be simply performed by only sliding a knob. For this reason, if an operator erroneously slides the knob in the lock release direction while data write or read operation is performed, the lock of the HDD is released, and the connectors for connecting the HDD to the base unit may be disconnected from each other.

In such a case, since the supply of a current to the HDD is interrupted while data write or read is performed, the written or readout data in or from the HDD is erroneously erased.

SUMMARY OF THE INVENTION

It is an object of the present invention to provide a portable apparatus in which the lock of a storage unit cannot be released while it is operated so as to prevent erroneous erasure of data.

According to the present invention, there is provided a portable apparatus comprising: storage means formed into a unit as a module and having a first connector, a base unit including a bottom plate and a receiving portion, formed in the bottom plate, for detachably housing the storage means, the receiving portion having a second connector to be electrically connected to the first connector, lock means which is engaged with the storage means housed in the receiving portion of the base unit so as to confine the storage means in the receiving portion of the base unit, normally open switch means which is turned on upon a lock operation of the lock means, while the lock means locks the storage means to the receiving portion of the base unit, so as to supply a current to the storage means, and fixing means for fixing the storage means, which is locked to the receiving portion of the base unit, to the receiving portion, the fixing means being engaged with the lock means to hold the lock means in a state in which the storage means is locked to the receiving portion.

According to the portable apparatus of the present invention, when the storage means is housed in the receiving portion of the base unit, the first and second connectors are electrically connected to each other. When the storage means is confined within the receiving portion by the lock means, disconnection of the connectors is prevented, and the switch means is turned on to allow supply of a current to the storage means.

The storage means housed in the receiving portion of the base unit is fixed to the receiving portion by the fixing means. This fixing means not only fixes the storage means but also engages it with the lock means, thus holding the lock means in a state wherein the storage means is locked to the receiving portion.

The lock means, therefore, is kept locked unless the fixed state of the storage means by means of the fixing means is released, and the storage means cannot be detached from the receiving portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 2 is an exploded perspective view showing a state wherein a storage unit is mounted in a base unit of the portable computer in FIG. 1;

FIG. 7 is a perspective view showing a state wherein the lock mechanism in FIG. 3 is attached to the base unit;

FIG. 8 is a perspective view showing the receiving portion of the base unit to which the storage unit in FIG. 2 is attached;

FIG. 10 is a perspective view showing a first connector attached to a case of the storage unit in FIG. 2;

FIG. 11 is a sectional view taken along a line XI—XI in FIG. 10;

FIG. 12 is a sectional view taken along a line XII—XII in FIG. 10;

FIG. 13 is a perspective view showing a second connector attached to the receiving portion of the base unit in FIG. 2;

FIG. 14 is a sectional view taken along a line XIV—XIV in FIG. 13;

FIG. 15 is a sectional view taken along a line XV—XV in FIG. 13;

FIG. 21 is a sectional view showing a state wherein the storage unit in FIG. 2 is inserted in the receiving portion of the base unit, and the first and second connectors are brought into contact with each other;

FIG. 22 is a sectional view showing a state wherein the connecting terminals of the connectors in FIG. 21 are brought into contact with each other upon insertion of the storage unit;

FIG. 23 is a sectional view showing a state wherein the case of the storage unit and the receiving portion of the base unit in FIG. 21 are engaged with each other upon insertion of the storage unit;

FIG. 27 is a sectional view showing a state wherein the connectors in FIG. 26 are connected to each other, and their connecting terminals are brought into contact with each other; and FIG. 28 is a sectional view showing a state wherein the case of the storage unit and the receiving portion are completely engaged with each other while the storage unit in FIG. 24 is housed in the receiving portion of the base unit.

DETAILED DESCRIPTION OF THE PREFERRED EMBODIMENTS

Figure 1:
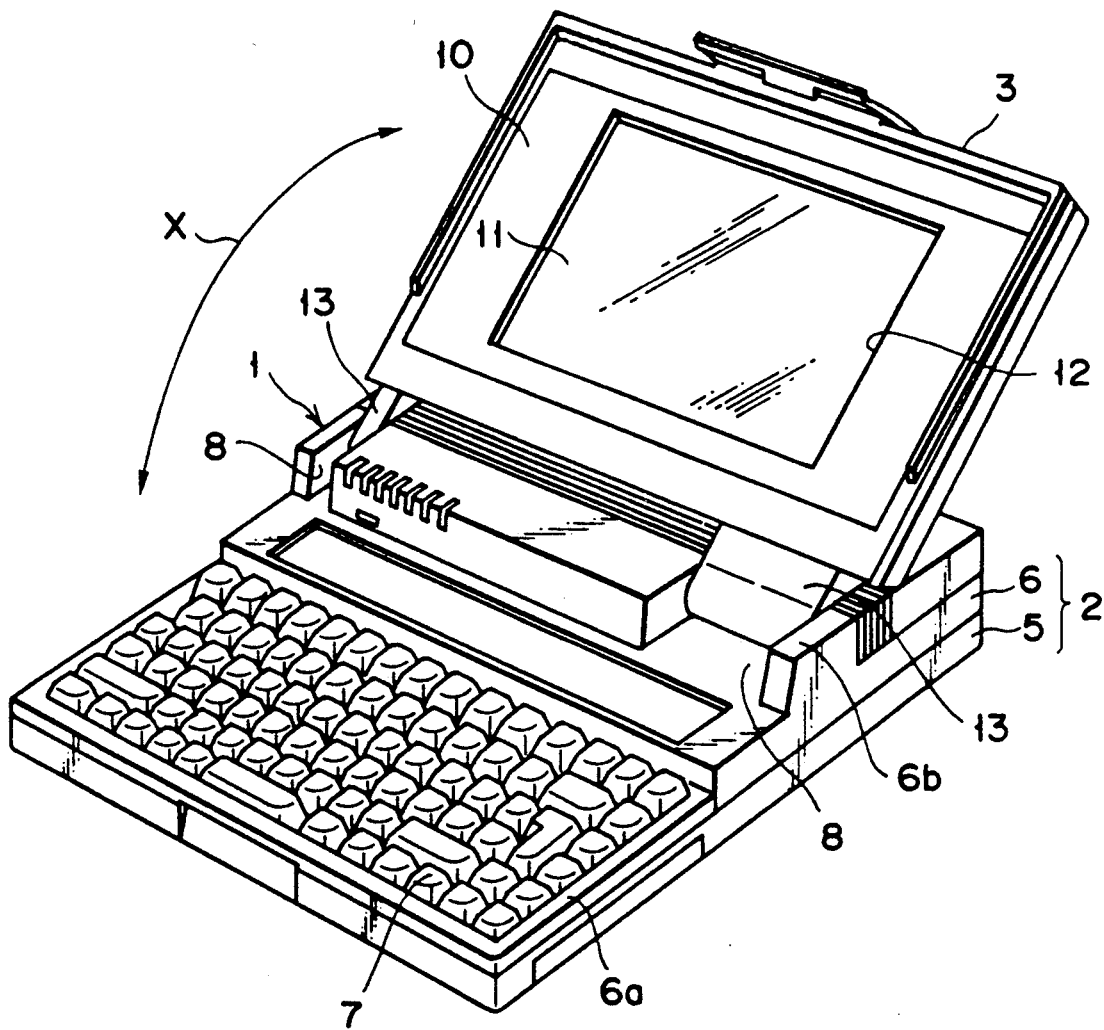
FIG. 1 is a perspective view showing a portable computer according to the present invention.

FIG. 1 shows a lap-top type portable computer 1. The portable computer 1 includes a base unit 2 and a flat panel type display unit 3. The base unit 2 is formed into a thin box having a rectangular shape. A floppy-disk drive device (FDD) is housed in the base unit 2.

The base unit 2 includes a bottom case 5 in which a printed circuit board 4 (See FIG. 7) is housed, and a top cover 6 for covering the bottom case 5. The top cover 6 consists of front portion 6a and rear portion 6b. A keyboard 7 is attached to the front portion 6a of the top cover 6. The rear portion 6b of the top cover 6 protrudes upward from the keyboard 7. A pair of mounting recesses 8 are formed at the front end of the rear portion 6b of the top cover 6.

The display unit 3 includes a rectangular housing 10 and a flat display 11 housed in this housing 10. The display 11 is externally exposed through an opening 12 in the front surface of the housing 10. The housing 10 of the display unit 3 has a pair of leg portions 13 to be respectively inserted in the mounting recesses 8 of the top cover 6. The leg portions 13 are pivotally coupled to the mounting recesses 8 of the top cover 6 by means of hinges (not shown), respectively. With this coupling, the display unit 3 is rotated between a closed position where the keyboard 7 is covered and an upright position where the keyboard 7 and the display 11 are exposed during an operation of the keyboard 7, as indicated by an arrow X in FIG. 1.

As shown in FIG. 2, the bottom case 5 of the base unit 2 has a flat bottom plate 15. A hard-disk drive device (HDD) 16 having a relatively large storage capacity is detachably mounted in a rear portion of the bottom plate 15 so that a system storage capacity is improved. A structure for mounting this HDD 16 will be described below.

As shown in FIG. 2, the HDD 6 has a case 17 having a flat, rectangular box-like shape. The case 17 includes front portion 17a and rear portion 17b. A driving unit for driving the hard disk and a heat unit are housed in the case 17. The head unit is used to write and read data in and from the hard disk. A cover plate 18 of the case 17 has a flat, rectangular plate-like shape. The four peripheral edge portions of the cover plate 18 extend outward from the side surfaces of the case 17. Of the peripheral edge portions of the cover plate 18, a peripheral edge portion 18c corresponding to the rear portion 17b of the case 17 has a notch 19 formed therein. A columnar engaging projection 20 is formed on the rear surface of the rear portion 17b of the case 17. This engaging projection 20 extends backward from the case 17. Guide projections 21 respectively extend from the right and left side surfaces of the front portion 17a of the case 17. Hook pieces 22 respectively extend from the front ends of the right and left side surfaces of the case 17. The hook pieces 22 extend forward from the front surface of the front portion 17a of the case 17 and from the cover plate 18.

As shown in FIG. 10, a connector mounting port 23 is formed in the front surface of the front portion 17a of the case 17 so as to extend in a lateral direction. A first connector 24 is mounted in the connector mounting port 23. The first connector 24 is electrically connected to the driving unit and the head unit in the case 17.

A receiving portion 25 for detachably mounting the HDD 16 is formed in the bottom plate 15 of the bottom case 5. The receiving portion 25 is set back from the bottom case 5. The recess 25 has a size to allow the case 17 to be fitted therein. The recess 25 is located below the rear portion 6b of the top cover 6 and constitutes an insertion opening 26 in the bottom plate 15 of the bottom case 5 so as to allow the HDD 16 to be inserted therein. A fitting portion 27 is formed in the edge defining the insertion opening 26. The edge of the cover plate 18 of the case 17 is to be fitted in the fitting portion 27. When the edge of the cover plate 18 is fitted in the fitting portion 27, the cover plate 18 of the case 17 becomes continuous with the bottom plate 15 of the bottom case 5 so that the cover plate 18 of the case 17 serves as a portion of the bottom plate 15 of the bottom case 5.

The recess 25 of the bottom case 5 includes a front surface 25a, a rear surface 25b, a pair of right and left side surfaces 25c and 25d, and a bottom surface 25e. Guide grooves 28 in which the guide projections 21 of the case 17 are inserted are formed in the right and left side surfaces 25c and 25d of the recess 25. Each guide groove 28 extends upward to the insertion opening 26 in the vertical direction. One end of each guide groove 28 is located near the bottom surface 25e of the recess 25, and the other end of each guide groove 28 is open to the fitting portion 27. Each guide groove 28 has an inclined portion 29 between the two ends. The inclined portion 29 of each guide groove 28 is gradually inclined to the rear portion of the recess 25 as it approaches the insertion opening 26 of the recess 25. The inclination angle of each inclined portion 29 is set to guide the front portion 17a of the case 17 of the HDD 16 toward the front surface 25a of the recess 25. When the guide projections 21 of the case 17 are respectively inserted in the guide grooves 28, the insertion direction of each guide projection 21 is guided by a corresponding one of the inclined portions 29. For this reason, the HDD 16 is inserted in the recess 25 of the base unit 2 in an inclined posture with respect to the recess 25.

A laterally extending connector mounting port 30 is formed in the front surface 25a of the recess 25. A second connector 31 is mounted in the connector mounting port 30. The second connector 31 is electrically connected to the printed circuit board 4 (see FIG. 15) in the bottom case 5. When the HDD 16 is inserted in the recess 25, the second connector 31 is electrically connected to the first connector 24 of the HDD 16.

Arrangements of these connectors 24 and 31 will be described below. As shown in FIGS. 10 to 12, the first connector 24 of the HDD 16 includes a connector body 33 consisting of a synthetic resin. The connector body 33 has a front surface 33a exposed to the connector mounting port 23. The front surface 33a of the connector body 33 laterally extends along the connector mounting port 23. Flat abutment portions 34 are respectively formed on the right and left end portions of the front surface 33a of the connector body 33. The abutment surfaces 34 are parallel to the front surface 25a of the recess 25. Positioning guide projections 35 respectively extend from the abutment surfaces 34. The guide projections 35 are gradually curved toward the cover plate 18 of the case 17 as they extend from the abutment surfaces 34. The front surface 33a of the connector body 33 is set back between the abutment surfaces 34 so as to form a recess 36. A terminal support wall 37 is formed at an extreme end of the recess 36 so as to extend to the abutment surfaces 34. The terminal support wall 37 extends forward from the abutment surfaces 34. A plurality of reinforcing ribs 46 are formed on the upper surface of the terminal support wall 37. A large number of grooves 38 extending in the front/rear directions of the terminal support wall 37 are arranged in a row on the lower surface of the terminal support wall 37. Pin type connecting terminals 39 are respectively arranged in the grooves 38. The connecting terminals 39 are guided into the case 17 through the rear wall of the connector body 33, and the distal ends of these connecting terminals 39 are electrically connected to the driving unit of the hard disk and the head unit described above. A guide wall 40 is formed on the upper edge of the front surface 33a of the connector body 33. The guide wall 40 serves as a fulcrum when the first and second connectors 24 and 31 are to be connected to each other. The guide wall 40 extends over the connector body 33 and protrudes forward from the abutment surfaces 34 of the connector body 33. A first fitting groove 41 is formed between the guide wall 40 and the terminal support wall 37. Four engaging holes 42 are laterally arranged at certain intervals on an upper surface 33b of the connector body 33. The fitting holes 42 are open to the first engaging groove 41. A fitting wall 43 parallel to the guide wall 40 is formed on the lower edge of the front surface 33a of the connector body 33. The fitting wall 43 extends between the abutment surfaces 34 and protrudes forward from the abutment surfaces 34. A second fitting groove 44 is formed between the fitting wall 43 and the terminal support wall 37. The connecting terminals 39 are exposed in the fitting groove 44. Tongues 45 are respectively formed on the light and left side portions of the connector body 33. The tongues 45 are fastened to the cover plate 18 of the case 17 in the connector mounting port 23 of the case 17 with screws. With this arrangement, the first connector 24 is fixed to the case 17 while the abutment surfaces 34, the guide projections 35, the terminal support wall 37, the guide wall 40, and the fitting wall 43 of the connector body 33 protrude from the connector mounting port 23 of the case 17.

As shown in FIGS. 13 to 15, the second connector 31 of the base unit 2 includes a connector body 50 consisting of a synthetic resin. The connector body 50 has a front surface 50a exposed to the connector mounting port 30 of the recess 25. The front surface 50a of the connector body 50 laterally extends along the connector mounting port 30. Flat abutment surfaces 51 are formed at the right and left end portions of the front surface 50a of the connector body 50. The abutment surfaces 51 are parallel to the front surface 25a of the recess 25. When the HDD 16 is inserted in the recess 25, the abutment surfaces 51 of the connector body 50 are caused to oppose the abutment surfaces 34 of the first connector 24. Engaging holes 52 in which the guide projections 35 are inserted are respectively formed in the abutment surfaces 51 of the connector body 50. As shown in FIG. 15, each engaging hole 52 is gradually curved toward a deep portion so as to fit the arcuated shape of a corresponding one of the guide projections 35. A fitting recess 53 in which the terminal support wall 37 of the first connector 24 is detachably fitted is formed in the front surface 50a of the connector body 50. The fitting recess 53 extends between the abutment surfaces 51. A large number of grooves 54 extending in the front/rear direction of the fitting recess 53 are aligned on the lower surface of the fitting recess 53. A large number of pin type connecting terminals 55 are arranged in the respective grooves 54. The connecting terminals 55 protrude into the bottom case 5 of the base unit 2 through the rear wall of the connector body 50. Protruding portions 55a of the connecting terminals 55 are vertically bent to extend along the rear wall of the connector body 50. The distal end of each protruding portion 55a is electrically connected to the printed circuit board 4. As shown in FIG. 14, a portion of each connecting terminal 55 which is located inside the fitting recess 53 is bent upward to constitute a movable contact piece 56. A bending angle $\theta$ of the movable contact piece 56 is set to coincide with the insertion angle of the HDD 16 into the recess 25. First and second fitting projections 57 and 58 are formed on the front surface 50a of the connector body 50. The first and second fitting projections 57 and 58 are detachably fitted in the first and second fitting grooves 41 and 44, respectively. These fitting projections 57 and 58 respectively extend between the abutment surfaces 51 at the upper and lower sides of the fitting recess 53 and extend forward therefrom. A corner portion of the first fitting projection 57 located on the upper side of the fitting recess 53 which opposes the fitting recess 53 is curved in an arcuated shape to be smoothly fitted in the first fitting groove 41. Four positioning projections 59 extend from the upper edge of the first fitting projection 57 at certain intervals in the lateral direction of the connector body 50. When the HDD 16 is inserted in the recess 25, the positioning projections 59 are respectively fitted in the fitting holes 42 of the first connector 24, thus positioning the two connectors 24 and 31 in the lateral direction. A recess 60 in which the fitting wall 43 of the first connector 24 is slid is formed in the lower surface of the connector body 50. Tongues 61 are respectively formed on the right and left side portions of the connector body 50. The tongues 61 are located inside the connector mounting port 30 of the bottom case 5 and are fastened to the printed circuit board 4 of the bottom case 5 with screws. With this arrangement, the second connector 31 is fixed to the bottom case 5 while the abutment surfaces 51, the fitting projections 57 and 58, and the positioning projections 59 of the connector body 50 protrude from the connector mounting port 30 of the bottom case 5.

Figure 17:
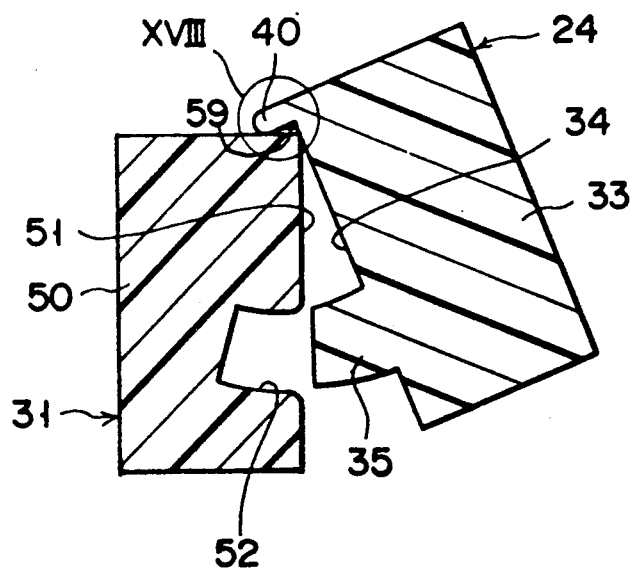
FIG. 17 is a sectional view showing a state wherein the connectors in FIG. 16 are brought into contact with each other upon mounting of the storage unit.
Figure 18:
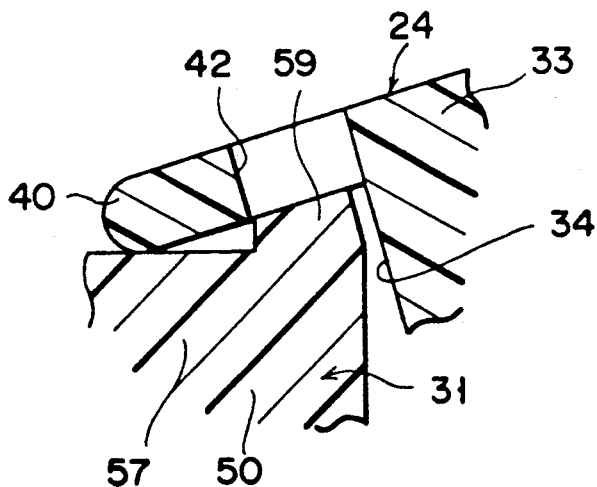
FIG. 18 is an enlarged sectional view showing a portion XVIII in FIG. 17.
Figure 19:
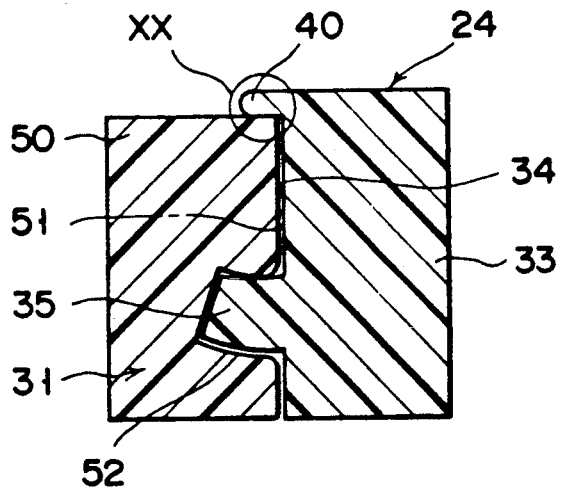
FIG. 19 is a sectional view showing a state wherein the connectors in FIG. 16 are connected to each other upon mounting of the storage unit.
Figure 20:
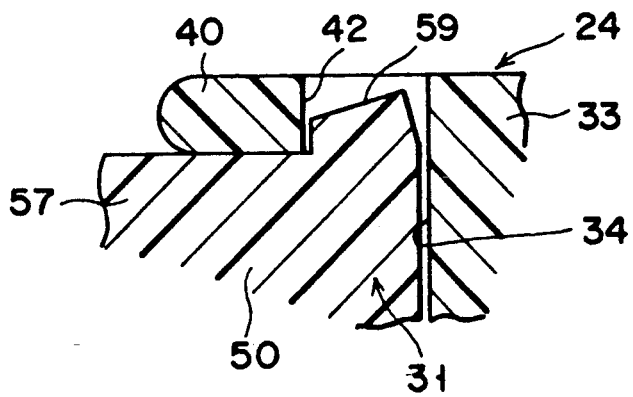
FIG. 20 is an enlarged sectional view showing a portion XX in FIG. 19.

In this arrangement, as shown in FIGS. 17 and 18, when the HDD 16 is obliquely inserted into the recess 25 along the inclined portions 29 of the guide grooves 28, the guide wall 40 of the first connector 24 is brought into contact with the upper surface of the first fitting projection 57 of the second connector 31. Upon this contact, the fitting holes 42 of the guide wall 40 are respectively fitted on the positioning projections 59 of the first fitting projection 57, thus positioning the first and second connectors 24 and 31 in the lateral direction. When the HDD 16 is pushed into the recess 25 in such a manner that the case 17 of the HDD 16 becomes parallel to the bottom plate 15 of the bottom case 5, the HDD 16 pivots on a contact portion between the first and second connectors 24 and 31. Upon this pivoting of the HDD 16, the guide projections 35 of the first connector 24 are respectively inserted in the engaging holes 52 of the second connector 31, and the fitting projections 57 and 58 of the second connector 31 are respectively inserted in the fitting grooves 41 and 44 of the first connector 24. In addition, the positioning projections 59 of the second connector 31 are respectively inserted in the fitting holes 42 of the first connector 24. As a result, the abutment surfaces 34 and 51 of the two connectors 24 and 31 are brought into contact with each other, and hence the connectors 24 and 31 are coupled to each other.

As shown in FIG. 22, while the guide wall 40 of the first connector 24 is in contact with the upper surface of the first fitting projection 57 of the second connector 31, the connecting terminals 39 of the first connector 24 are respectively in contact with the movable contact pieces 56 of the connecting terminals 55 of the second connector 31 from the above. These connecting terminals 39 and 55 are brought into slidable contact with each other upon pivoting of the HDD 16. While the connectors 24 and 31 are coupled to each other, they are vertically stacked on each other to be electrically connected to each other, as shown in FIG. 27.

As shown in FIG. 2, lock ports 65 in which the hook pieces 22 of the case 17 of the HDD 16 are respectively inserted are formed in the front surface 25a of the recess 25. The lock ports 65 are located on the right and left sides of the second connector 31. As shown in FIG. 23, when the HDD 16 is inserted in the recess 25, the lock ports 65 oppose the hook pieces 22 of the HDD 16, and an upper end corner portion of each hook piece 22 is brought into contact with an opening edge of a corresponding one of the lock ports piece 65. The hook pieces 22 enter the lock ports 65 upon pivoting of the HDD 16. As shown in FIG. 28, when the HDD 16 is completely inserted into the recess 25, the hook pieces 22 are hooked to the lock ports 65.

Figure 3:
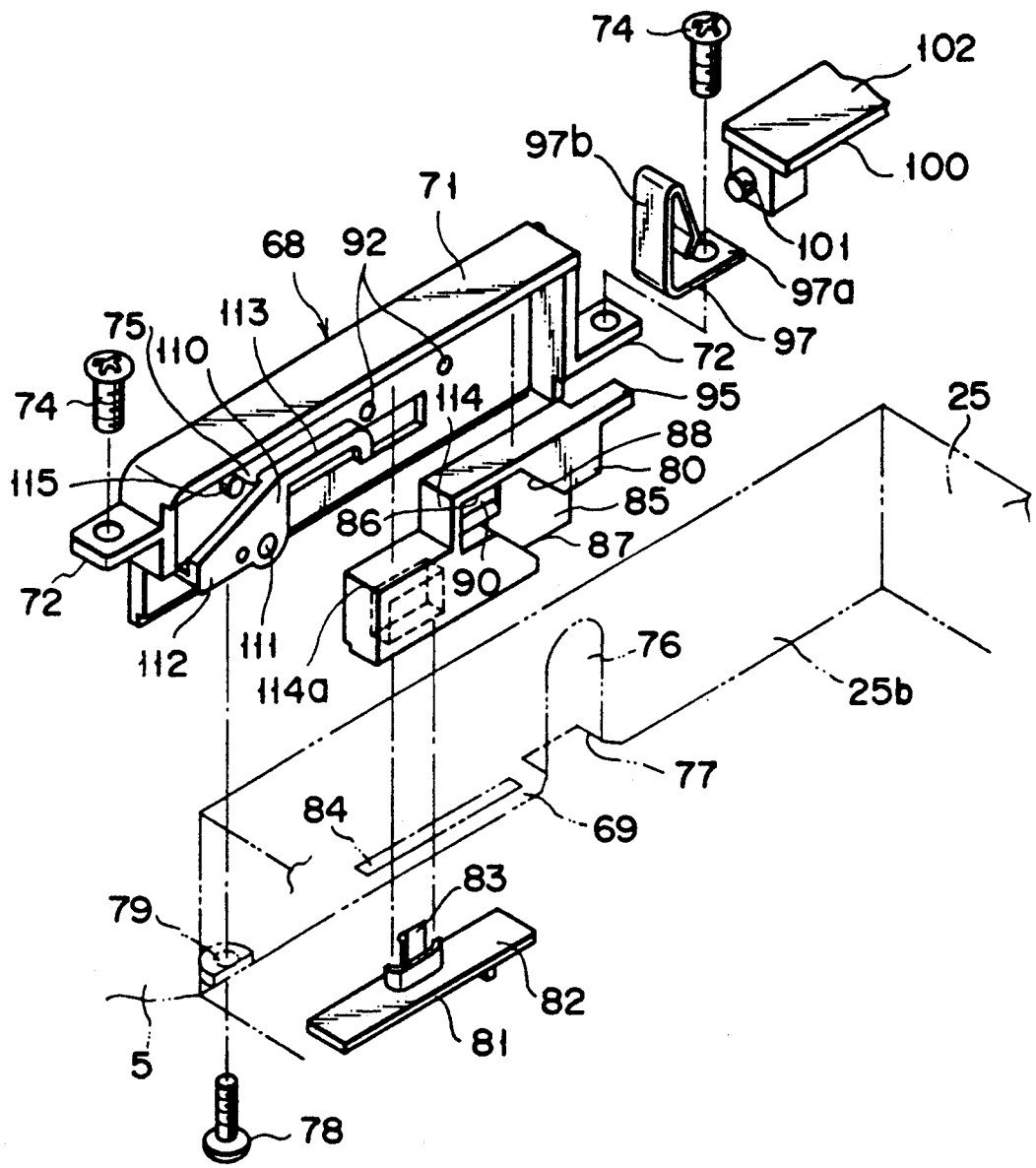
FIG. 3 is an exploded perspective view showing a lock mechanism for confining the storage unit in FIG. 2 within a receiving portion of the base unit.

A lock mechanism 68 for confining the HDD 16 in the recess 25 is arranged on the rear surface 25b of the recess 25. The lock mechanism 68 will be described below with reference to FIGS. 2 to 9. The rear surface 25b of the recess 25 protrudes into the recess 25. A support wall 69 is formed on an end portion of the rear surface 25b of the recess 25 on the side of the insertion opening 26 so as to oppose the rear edge portion 18c of the cover plate 18 of the HDD 16. A pair of seat portions 70 of the rear edge portion 18c of the cover plate 18 are supported by the support wall 69. The seat portions 70 respectively have through holes 79 in which screws 78 for fixing the HDD 16 to the recess 25 are inserted. As shown in FIG. 3 or 7, a cover 71 for covering the rear surface 25b of the recess 25 is mounted in the bottom case 5. The cover 71 has an elongate shape extending in the lateral direction of the recess 25. The cover 71 has mounting tongues 72 on its two end portions. These tongues 72 are fixed to bosses 73 on the inner surface of the bottom case 5 with screws 74. A lock chamber 75 is formed between the cover 71 and the rear surface 25b of the recess 25. An insertion port 76 in which the engaging projection 20 of the HDD 16 is inserted is formed in the rear surface 25b of the recess 25. The insertion port 76 has a groove-like shape vertically extending in the rear surface 25b of the recess 25. The recess 25 and the lock chamber 75 communicate with each other through this insertion port 76. An opening 77 is formed in the support wall 69 in the recess 25 so as to guide the engaging projection 20 of the case 17 into the insertion port 76.

As shown in FIGS. 3 to 6, a slider 80 is housed in the lock chamber 75. The slider 80 is made of a synthetic resin. The slider 80 is sandwiched between the cover 71 and the rear surface 25b and the support wall 69 of the recess 25 so as to be slidable in the lateral direction of the recess 25. An operation knob 81 is attached to the slider 80 and is used to operate it. The operation knob 81 comprises a slide plate 82 located on the support wall 69, and a pawl 83 for coupling the slide plate 82 to the slider 80. The pawl 83 is hooked to the slider 80 through an elongated hole 84 of the support wall 69. The slide plate 82 is arranged at a position corresponding to the notch 19 of the cover plate 18 of the HDD 16. When the HDD 16 is inserted into the recess 25, the slide plate 82 is externally exposed from the bottom case 5 through the notch 19.

Figure 4:
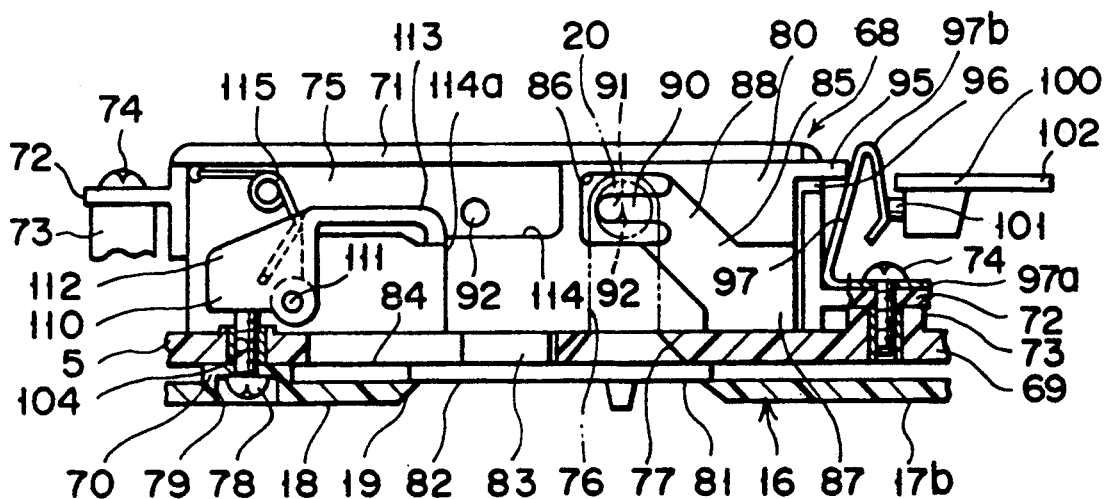
FIG. 4 is a sectional view showing a state wherein a slider of the lock mechanism in FIG. 3 is slid to a lock position at which the storage unit is locked to the receiving portion, and the slider is held at the lock position by a screw for fixing the storage unit to the receiving portion.
Figure 6:
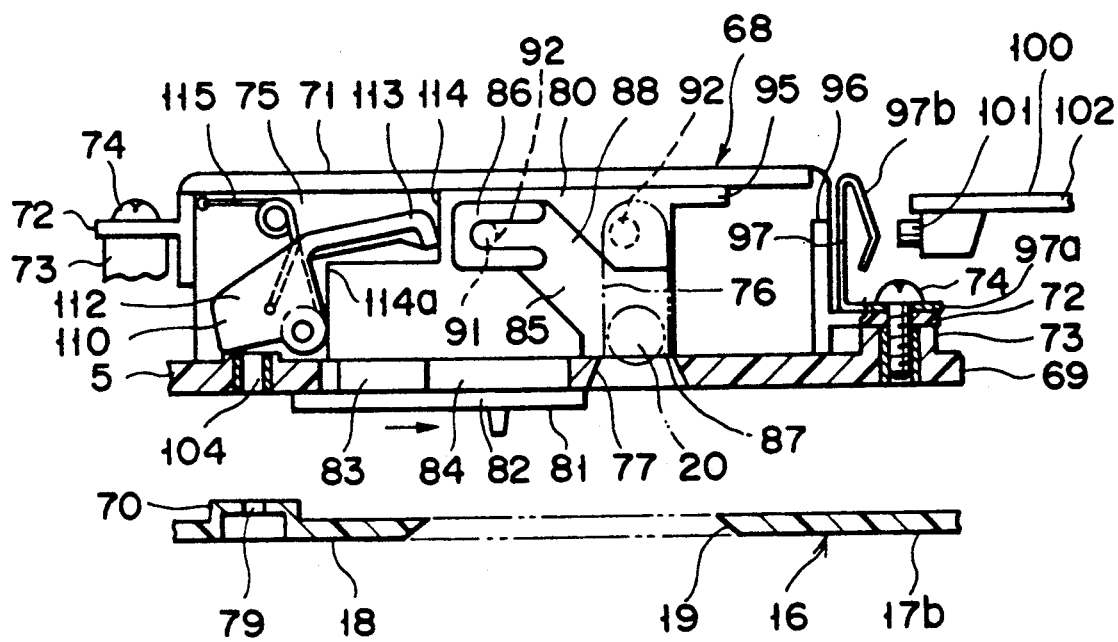
FIG. 6 is a sectional view showing a state wherein the slider of the lock mechanism in FIG. 3 is slid to the lock release position.
Figure 9:
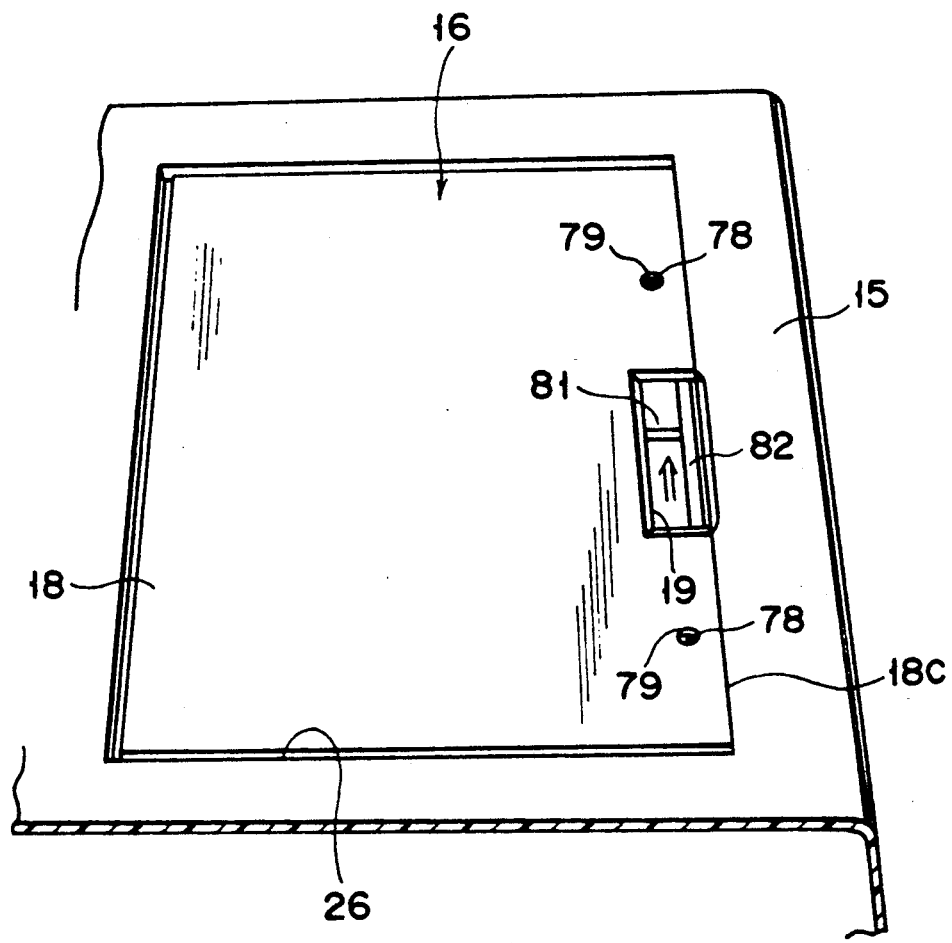
FIG. 9 is a perspective view showing a state wherein the storage unit is mounted in the receiving portion of the base unit in FIG. 2.
Figure 16:
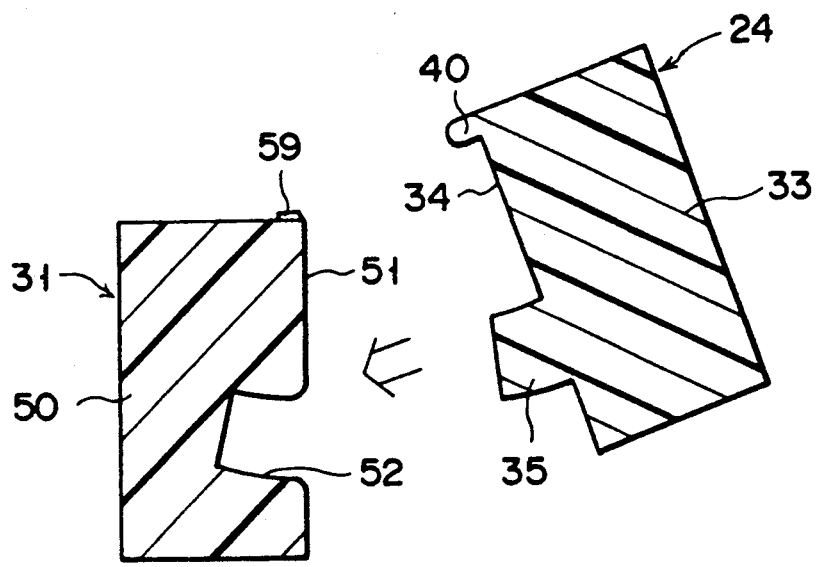
FIG. 16 is a sectional view showing a state wherein the connectors respectively shown in FIGS. 10 and 13 oppose each other when the storage unit is mounted.

A lock groove 85 in which the engaging projection 20 of the HDD 16 is inserted is formed in a surface of the slider 80 which opposes the rear surface 25b of the recess 25. As shown in FIGS. 3 and 4, the lock groove 85 includes a lock portion 86 continuous with an extreme end portion of the insertion port 76 through which the engaging projection 20 passes, an entrance portion 87 continuous with the bottom of the insertion port 76 on the opening 77 side, and an oblique guide portion 88 arranged between the lock portion 86 and the entrance portion 87. The lock groove 85 is bent in the form of a crank as a whole. The entrance portion 87 is continuously open to a surface of the slider 80 which is in slidable contact with the support wall 69 and extends to the opening 77 of the support wall 69. As shown in FIG. 4, therefore, when the slider 80 is slid to the rightmost position, the lock portion 86 of the lock groove 85 is caused to communicate with the insertion port 76. This state corresponds to the lock position of the slider 80. In contrast to this, if the slider 80 is slid to the leftmost position, the entrance portion 87 of the lock groove 85 is caused to communicate with the insertion port 76 and the opening 77, as shown in FIG. 6. This state corresponds to the lock release position of the slider 80.

Figure 5:
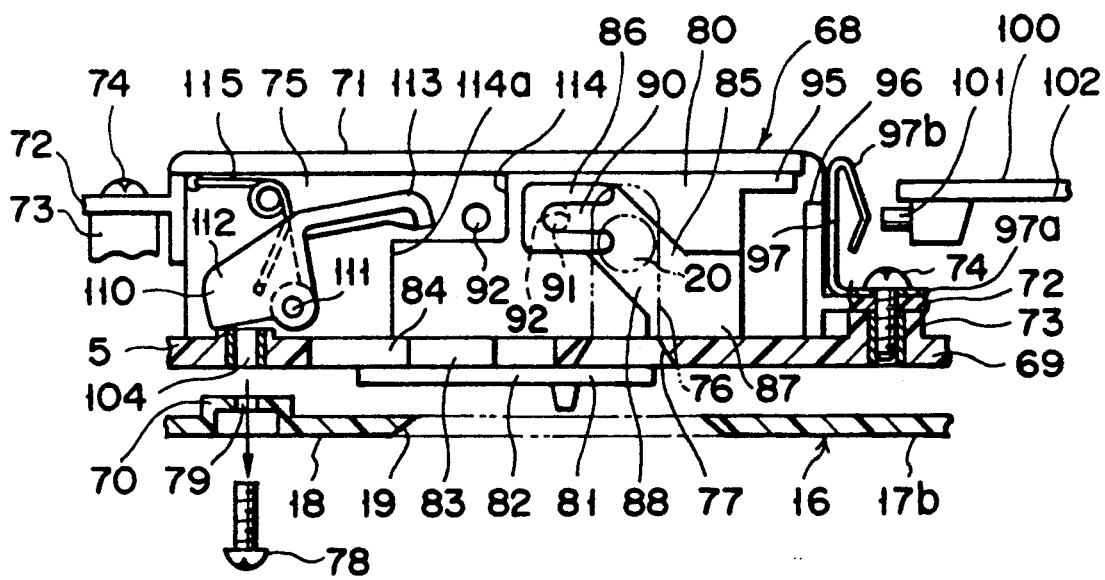
FIG. 5 is a sectional view showing a state wherein the slider of the lock mechanism in FIG. 3 is slid to a position between the lock position and a lock release position.

With this arrangement, if the slider 80 is located at the lock release position, since the entrance portion 87 of the lock groove 85 communicates with the insertion port 76 and the opening 77, the engaging projection 20 of the HDD 16 can be inserted and removed in and from the insertion port 76. In order to hold the HDD 16 in the recess 25, the engaging projection 20 of the HDD 16 is guided into the lock groove 85 through the opening 77 and the insertion port 76. When the slider 80 is slid toward the lock position in this state, the engaging projection 20 is guided into the guide portion 88 of the lock groove 85 and is moved to the extreme end of the insertion port 76, as shown in FIG. 5. When the engaging projection 20 reaches the extreme end of the insertion port 76, the engaging projection 20 is guided to the lock portion 86 of the guide groove 85. As a result, the engaging projection 20 is held at the extreme end of the insertion port 76 so as not to be removed.

The slider 80 includes a lock piece 90 which can be elastically deformed in the direction of thickness of the slider 80. A projection 91 which is brought into slidable contact with the cover 71 is formed on the distal end of the lock piece 90. A pair of positioning holes 92 are formed in the cover 71 with which the projection 91 is in slidable contact. The projection 91 is fitted in one of the positioning holes 92 when the slider 80 is slid to the lock position or the lock release position. When the projection 91 is positioned to one of the positioning holes 92, the projection 91 is fitted in the positioning hole 92 with the elastic force of the lock piece 90. With this fitting operation, when the slider 80 is slid to the lock position or the lock release position, the projection 91 clicks into the corresponding positioning hole 92, and the slider 80 is held at the lock position or the lock release position.

A switch press piece 95 extends from one end of the slider 80. The length of the switch press piece 95 is set such that the switch press piece 95 is housed in the lock chamber 75 when the slider 80 is slid to the lock release position, and extends outward from the lock chamber 75 through a through hole 96 of the cover 71 when the slider 80 is slid to the lock position. As shown in FIGS. 4 to 7, an L-shaped leaf spring 97 is arranged at one end of the cover 71 having the through hole 96. The leaf spring 97 comprises a fixed piece 97a fixed to the tongue 72 of the cover 71 by the screw 74, and a movable piece 97b vertically bent from the fixed piece 97a. The movable piece 97b of the leaf spring 97 is arranged to oppose the through hole 96. When the movable piece 97b of the leaf spring 97 is pressed by the switch press piece 95 of the slider 80, it is displaced.

A normally open switch 100 which is turned on and off by the movable piece 97b is arranged at a position opposite to the movable piece 97b of the leaf spring 97. The switch 100 comprises an actuator 101 to be pressed by the movable piece 97b of the leaf spring 97, and a base board 102 for supporting the actuator 101. The base board 102 is supported by the bottom case 5 of the base unit 2 through a screw 103. The switch 100 is electrically connected to a power source circuit of the printed circuit board 4 by the base board 102. With this arrangement, when the slider 80 is slid to the lock position, and the movable piece 97b of the leaf spring 97 is pressed by the switch press piece 95 of the slider 80, the movable piece 97b is deformed to press the actuator 101 of the switch 100, as shown in FIG. 4. Upon this pressing action, the switch 100 is turned on to allow supply of a current to the HDD 16 through the first connector 24 and second connector 31.

As shown in FIG. 6, when the slider 80 is slid to the lock release position, the pressed state of the movable piece 97b of the leaf spring 97 which is caused by the switch press piece 95 is released. As a result, the movable piece 97b of the leaf spring 97 is restored by its own elastic force in a direction to be separated from the actuator 101. Upon restoration of the movable piece 97b, the switch 100 is turned off to disconnect the current supply to the HDD 16.

In addition, the HDD 16 locked in the recess 25 by the lock mechanism 68 is fixed to the recess 25 by the screw 78. The screw 78 is screwed into a screw hole 104 of the support wall 69 through the through hole 79 of the cover plate 18 of the HDD 16. As a result, the HDD 16 is fixed to the recess 25 while removal of the HDD 16 is prevented. As shown in FIG. 4, one screw hole 104 of the support wall 69 is open to the lock chamber 75. For this reason, while the HDD 16 is fixed by the screw 78, the distal end of the screw 78 extends into the lock chamber 75.

As shown in FIGS. 3 to 6, a lock member 110 for holding the slider 80 at the lock position is housed in the lock chamber 75. The lock member 110 is arranged at a position opposite to the switch 100. The lock member 110 comprises a base portion 112 pivotally supported on the cover 71 by a pivot shaft 111, and a lock arm 113 extending from the base portion 112 to the slider 80. An engaging recess 114 is formed in a corner portion of the slider 80 which opposes the lock arm 113. The lock arm 113 of the lock member 110 is inserted in the engaging recess 114 when the slider 80 is slid to the lock release position. As shown in FIG. 5, the lock member 110 is biased by a torsion coil spring 115 so as to pivot counterclockwise. Upon pivoting of this lock member 110, the distal end of the lock arm 113 opposes the engaging recess 114, and engagement of the lock arm 113 with the slider 80 is avoided. The base portion 112 of the lock member 110 is located on the screw hole 104 open to the lock chamber 75. As shown in FIG. 4, when the screw 78 for fixing the HDD 16 is screwed into the screw hole 104, the distal end of the screw 78 is brought into contact with the base portion 112 of the lock member 110. Upon this contact, the lock member 110 is forcibly pivoted clockwise against the force of the torsion coil spring 115. Therefore, while the slider 80 is at the lock position, the distal end of the lock arm 113 of the lock member 110 is hooked on a corner portion 114a of the engaging recess 114, and the slider 80 is held not to be moved from the lock position.

A procedure for mounting the HDD 16 in the base unit 2 of the portable computer 1 will be described below.

The base unit 2 is turned over to expose the recess 25 of the base unit 2. In this state, as shown in FIG. 21, the guide projections 21 of the HDD 16 are inserted in the guide grooves 28 while the case 17 of the HDD 16 is tilted along the inclined portions 29 of the guide grooves 28 of the recess 25. The HDD 16 is then inserted in the recess 25 of the base unit 2 in an inclined posture, so that the front portion 17a of the case 17 enters the recess 25. When the guide projections 21 reach the distal ends of the guide grooves 28, the guide wall 40 of the first connector 24 is brought into contact with the upper surface of the fitting projection 57 of the second connector 31, and the fitting holes 42 of the guide wall 40 are fitted on the positioning projections 59 of the first fitting projection 57. At the same time, the guide projections 35 of the first connector 24 are inserted in the engaging holes 52 of the second connector 31, and the fitting projections 57 and 58 of the second connector 31 are fitted in the fitting grooves 41 and 44 of the first connector 24. At this time, the hook pieces 22 of the case 17 oppose the lock ports 65 of the recess 25.

Figures 24, 25:
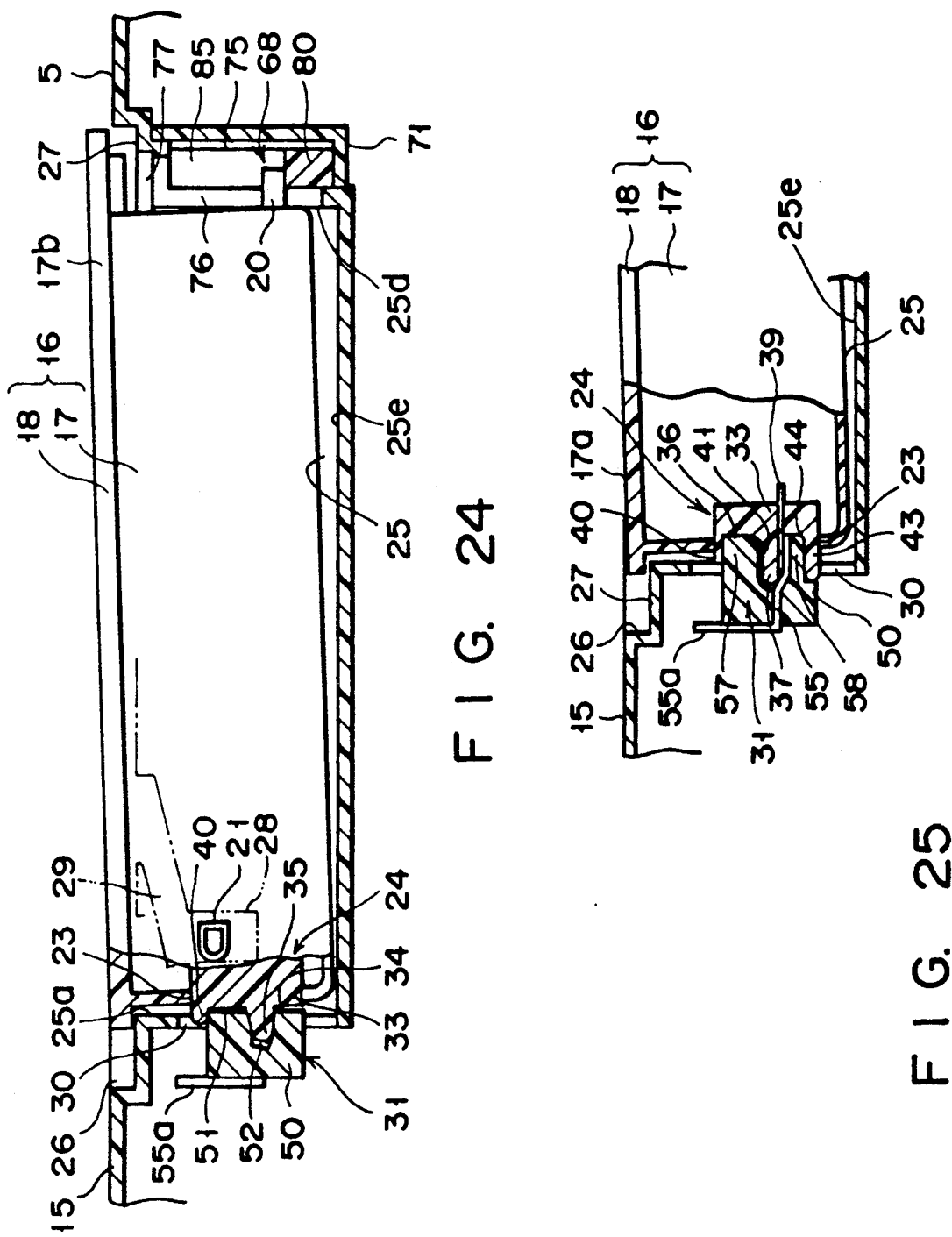
FIG. 24 is a sectional view showing a state wherein the storage unit in FIG. 21 is being housed in the receiving portion of the base unit.
FIG. 25 is a sectional view showing a state wherein the connectors in FIG. 24 are connected to each other, and their connecting terminals are brought into contact with each other.
Figure 26:
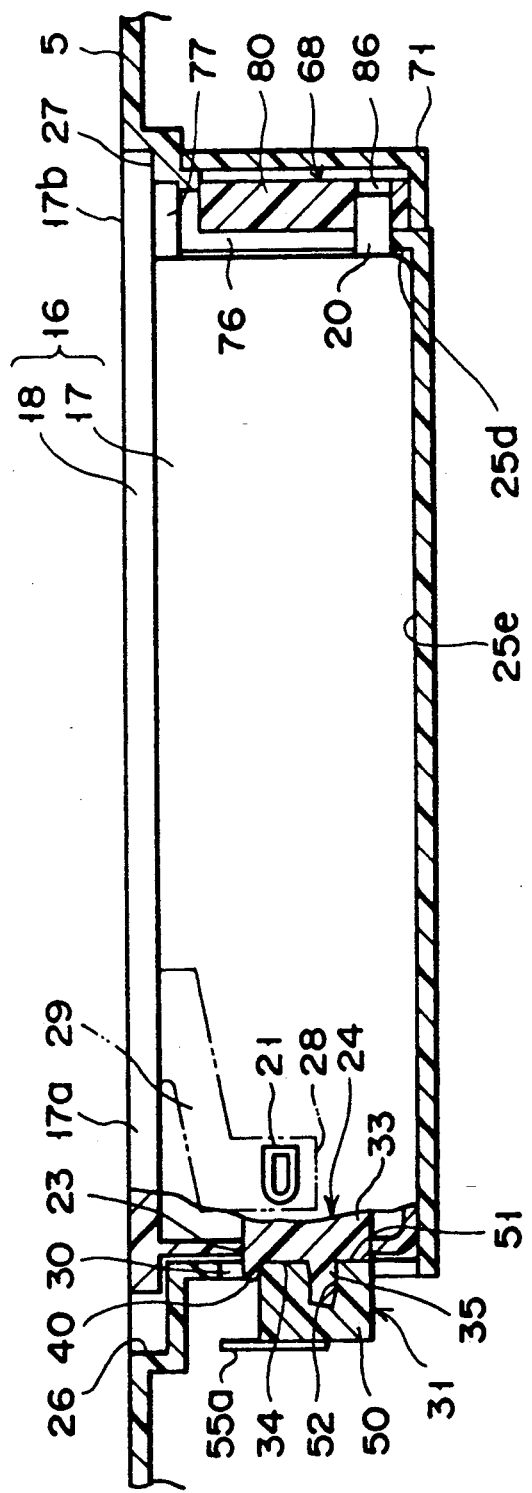
FIG. 26 is a sectional view showing a state wherein the storage unit in FIG. 24 is completely housed in the receiving portion of the base unit.

When the HDD 16 is further inserted, at the rear portion 17b of the case 17, the engaging projection 20 extending from the rear surface of the case 17 approaches the support wall 69 of the recess 25 and is guided to the opening 77 of the support wall 69. When the rear portion 17b of the case 17 is inserted in the recess 25 in this state, the HDD 16 pivots downward on a contact portion between the first connector 24 and second connector 31. Upon this pivoting of the HDD 16, the guide projections 35 of the first connector 24 are inserted into deep portions of the engaging holes 52 of the second connector 31, as shown in FIGS. 24 and 25. At the same time, the fitting projections 57 and 58 of the second connector 31 are inserted into deep portions of the fitting grooves 41 and 44 of the first connector 24. As a result, the distal end of the connecting terminals 39 of the first connector 24 vertically overlaps the movable contact piece 56 of a corresponding one of the connecting terminals 55 of the second connector 31, and these connecting terminals 39 and 55 are brought into slidable contact with each other. In addition, as shown in FIG. 24, as the HDD 16 pivots, the engaging projection 20 of the case 17 is guided from the opening 77 of the support wall 69 to the insertion port 76, and the rear portion 17b of the case 17 enters the recess 25. In this case, as shown in FIG. 6, the slider 80 of the lock mechanism 68 for locking the HDD 16 is slid to the lock release position, and the entrance portion 87 of the lock groove 85 of the slider 80 is caused to communicate with the insertion port 76. For this reason, the HDD 16 pivots until the engaging projection 20 of the case 17 is brought into contact with the inner surface of the entrance portion 87 of the lock groove 85.

When the engaging projection 20 of the case 17 is brought into contact with the inner surface of the entrance portion 87 of the lock groove 85, the slide plate 82 of the operation knob 81 is urged in a direction indicated by an arrow in FIG. 6 to slide the slider 80 from the lock release position to the lock position. As a result, the engaging projection 20 of the HDD 16 is guided by the guide portion 88 of the lock groove 85 to be moved toward the extreme end of the insertion port 76. The engaging projection 20 is guided to the lock portion 86 of the lock groove 85 and is held at the extreme end of the insertion port 76. Upon movement of the engaging projection 20, pivoting of the HDD 16 is resumed, and insertion of the guide projections 35 into the engaging holes 52 and of the fitting projections 57 and 58 into the fitting grooves 41 and 44 is continuously performed. In addition, upon pivoting of the HDD 16, the hook pieces 22 of the case 17 enter the lock ports 65 of the recess 25.

When the engaging projection 20 of the case 17 reaches the extreme end of the insertion port 76, the case 17 of the HDD 16 is completely fitted in the recess 25. As a result, the cover plate 18 of the case 17 becomes continuous with the bottom plate 15 of the bottom case 5 so that the insertion opening 26 of the recess 25 is covered with cover plate 18. In addition, when pivoting of the HDD 16 is resumed, the abutment surfaces 34 of the first connector 24 and the abutment surfaces 51 of the second connector 31 are brought into contact with each other. While the abutment surfaces 34 and 51 of these connectors 24 and 31 are in contact with each other, the positioning projections 59 of the second connector 31 are respectively fitted in the fitting holes 42 of the first connector 24. At the same time, the fitting projections 57 and 58 of the second connector 31 are completely fitted in the fitting grooves 41 and 44 of the first connector 24. Upon this fitting operation, removal of the first connector 24 and second connector 31 is prevented. In addition, the connecting terminals 39 and 55 of the connectors 24 and 31 overlap each other so that the printed circuit board 4 and the HDD 16 are electrically connected to each other.

When the slider 80 is slid to the lock position, the switch press piece 95 protrudes from the through hole 96 of the cover 71 to press the movable piece 97b of the leaf spring 97. The movable piece 97b is then deformed to press the actuator 101 of the switch 100. As a result, the switch 100 is turned on to allow current supply to the HDD 16.

Subsequently, as shown in FIG. 4, the screw 78 is inserted in the through hole 79 of the cover plate 18 of the HDD 16. When this screw 78 is screwed into the screw hole 104 of the support wall 69, the rear portion 17b of the case 17 of the HDD 16 is fixed to the recess 25. Since one screw hole 104 is open to the lock chamber 75, the distal end of the screw 78 is brought into contact with the base portion 112 of the lock member 110. The screw 78 forcibly pivots the lock member 110 clockwise against the force of the torsion coil spring 115. Upon pivoting of this lock member 110, the distal end of the look arm 113 is hooked on the corner portion 114a of the engaging recess 114 of the slider 80 so that the slider 80 is held not to be moved from the lock position.

In the portable computer 1 having the above-described arrangement, when the HDD 16 is fixed to the recess 25 with the screw 78, the slider 80 of the lock mechanism 68 for locking the HDD 16 to the recess 25 is held not to be moved from the lock position. For this reason, the slider 80 cannot be slid to the lock release position unless the screw 78 is removed. That is, a release operation of the lock of the HDD 16 mounted in the base unit 2 requires an additional operation of removing the screw 78. Even if an operator erroneously attempts to slide the operation knob 81 of the slider 80 to the lock release position in the process of writing or reading data in or from the HDD 16, since the slider 80 is held at the lock position, disconnection of the first connector 24 and second connector 31 can be prevented to maintain current supply to the HDD 16. This prevents the erroneous operation that the HDD 16 is detached from the base unit 2 during an operation of the HDD 16.

The portable apparatus according to the present invention is not limited to a lap-top type portable computer and may be equally applied to a word processor.

In addition, a storage unit is not limited to an HDD. In place of this HDD, a floppy disk drive device (FDD) or an optical disk drive device may be used.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A portable apparatus comprising:
    storage means formed into a unit as a module and having a first connector;
    a base unit including a bottom plate and a receiving portion, formed in said bottom plate, for detachably housing said storage means, said receiving portion having a second connector to be electrically connected to said first connector;
    lock means which is engaged with said storage means housed in said receiving portion of said base unit so as to confine said storage means in said receiving portion of said base unit;
    normally open switch means which is turned on upon a lock operation of said lock means, while said lock means locks said storage means to said receiving portion of said base unit, so as to supply a current to said storage means; and
    fixing means for fixing said storage means, which is locked to said receiving portion of said base unit, to said receiving portion, said fixing means being engaged with said lock means to hold said lock means in a state in which said storage means is locked to said receiving portion.

2. An apparatus according to claim 1, wherein said storage means includes a flat, box-like case for housing a hard disk, and an engaging projection extends from said case.

3. An apparatus according to claim 2, wherein said case of said storage means includes a front portion and a rear portion, said first connector is mounted on said front portion, and said engaging projection extends from said rear portion.

4. An apparatus according to claim 2, wherein said receiving portion of said base unit is a recess which is large enough to allow said case of said storage means to be inserted therein.

5. An apparatus according to claim 2, wherein said receiving portion of said base unit includes a front surface and a rear surface which oppose each other, said second connector is mounted on said front surface, and an insertion port in which said engaging projection of said case is inserted is formed in said rear surface.

6. An apparatus according to claim 2, wherein said lock means includes a slider which is slid between a lock position where said storage means is confined in said receiving portion and a lock release position where lock of said storage means is released, and said slider has a switch press piece for closing/opening switch means, and a lock groove in which said engaging projection inserted in said insertion port is inserted, and said lock groove has a guide portion for guiding said engaging projection of said case toward an extreme end of said insertion port when said slider is slid to the lock position.

7. An apparatus according to claim 6, wherein said lock means includes a lock member for holding said slider at the lock position when said slider is slid to the lock position, and said lock member is pivotally supported by said base unit and is biased by a spring in a direction to be separated from said slider.

8. An apparatus according to claim 7, wherein said lock member includes a base portion with which said fixing means is brought into contact, and said lock member is pivoted in a direction to be engaged with said slider slid to the lock position upon contact with said fixing means, thereby holding said slider not to be moved from the lock position.

9. An apparatus according to claim 1, wherein said fixing means is a screw which is screwed into said bottom plate of said base unit through said storage means.

10. An apparatus according to claim 1, wherein said base unit includes a front portion and a rear portion, a keyboard is mounted on said front portion of said base unit, and a display unit is mounted on said rear portion of said base unit.

11. An apparatus according to claim 10, wherein said display unit is mounted on said base unit so as to be pivoted between a close position where said keyboard is covered and a upright position where said keyboard is exposed.

12. A portable apparatus including:
    storage means formed into a unit as a module;
    a base unit having a bottom plate, a recess for detachably housing said storage unit being formed in said bottom plate;
    a first connector arranged on said storage means;
    a second connector arranged in said recess of said base unit, said first connector being detachably connected to said second connector; and
    lock means for confining said storage means in said recess and maintaining a connecting state of said first connector and said second connector, comprising:
    normally open switch means which is turned on upon a lock operation of said lock means, while connection of said connectors is maintained by said lock means, so as to supply a current to said storage means; and
    holding means for locking said lock means so as to maintain the connecting state of said connectors, said holding means fixing said storage means to said recess of said base unit.

13. A method of assembling a portable apparatus including:
   storage means formed into a unit as a module and having a first connector; and
   a base unit including a bottom plate and a receiving portion, formed in said bottom plate, for detachably housing said storage means, said receiving portion having a second connector to be electrically connected to said first connector,
   said storage means being fixed to said receiving portion of said base unit, comprising the steps of:
   inserting said storage means in said receiving portion of said base unit, and electrically connecting said first connector to said second connector;
   confining said storage means, which is inserted in said receiving portion of said base unit, in said receiving portion through lock means;
   allowing a current to be supplied to said storage means by using normally open switch means which is turned on upon a lock operation of said lock means when said lock means confines said storage means in said receiving portion of said base unit; and
   holding said storage means, which is locked to said receiving portion of said base unit, through fixing means, said fixing means being engaged with said lock means to hold said lock means in a state in which said storage means is locked to said receiving portion.

* * * * *